United States Patent
Tsaur et al.

(10) Patent No.: US 8,495,023 B1
(45) Date of Patent: Jul. 23, 2013

(54) DELTA CATALOGS IN A BACKUP SYSTEM

(75) Inventors: Ynn-Pyng "Anker" Tsaur, Oviedo, FL (US); Baige Wang, Lake Mary, FL (US); Kirk L. Searls, Maitland, FL (US)

(73) Assignee: Symantec Operating Corporation, Mountain View, CA (US)

( * ) Notice: Subject to any disclaimer, the term of this patent is extended or adjusted under 35 U.S.C. 154(b) by 2552 days.

(21) Appl. No.: 10/931,636

(22) Filed: Sep. 1, 2004

(51) Int. Cl.
*G06F 17/20* (2006.01)

(52) U.S. Cl.
USPC ........................................................ 707/646

(58) Field of Classification Search
USPC ........................................................ 707/204
See application file for complete search history.

(56) References Cited

U.S. PATENT DOCUMENTS

| | | | | |
|---|---|---|---|---|
| 5,229,768 | A * | 7/1993 | Thomas | 341/51 |
| 5,446,888 | A * | 8/1995 | Pyne | 707/10 |
| 5,457,796 | A * | 10/1995 | Thompson | 707/203 |
| 5,634,052 | A | 5/1997 | Morris | |
| 5,721,907 | A * | 2/1998 | Pyne | 707/10 |
| 5,745,756 | A * | 4/1998 | Henley | 707/204 |
| 5,873,101 | A * | 2/1999 | Klein | 707/204 |
| 5,873,103 | A * | 2/1999 | Trede et al. | 707/204 |
| 6,016,553 | A * | 1/2000 | Schneider et al. | 714/21 |
| 6,047,053 | A * | 4/2000 | Miner et al. | 379/201.01 |
| 6,058,163 | A * | 5/2000 | Pattison et al. | 379/85 |
| 6,199,178 | B1 * | 3/2001 | Schneider et al. | 714/21 |
| 6,240,527 | B1 * | 5/2001 | Schneider et al. | 714/21 |
| 6,560,615 | B1 * | 5/2003 | Zayas et al. | 707/202 |
| 6,865,655 | B1 | 3/2005 | Andersen | |
| 6,889,249 | B2 * | 5/2005 | Miloushev et al. | 709/213 |
| 6,934,725 | B1 * | 8/2005 | Dings | 707/204 |
| 7,065,657 | B1 * | 6/2006 | Moran | 726/5 |
| 2001/0002204 | A1 * | 5/2001 | Jebens et al. | 375/240.01 |
| 2002/0049883 | A1 * | 4/2002 | Schneider et al. | 711/100 |
| 2003/0004980 | A1 * | 1/2003 | Kishi et al. | 707/204 |
| 2003/0184801 | A1 * | 10/2003 | Murata | 358/1.16 |
| 2004/0204949 | A1 * | 10/2004 | Shaji et al. | 705/1 |
| 2005/0216527 | A1 * | 9/2005 | Erlingsson | 707/202 |
| 2006/0036568 | A1 * | 2/2006 | Moore et al. | 707/1 |

OTHER PUBLICATIONS

Ghadmi et al., "Norton Ghost(tm) User's Guide: The Fast PC Cloning Solution", Jan. 26, 1999, Symantec Corp, p. 1, 2, 9, 10, 11, 16, 21, 24, 29, 35, 38, 39, 45, 49, 53, 54, 74, 75, 81, 82, 85, 87.*

Lawrence et al., "Symantec Ghost Implementation Guide", Nov. 15, 2001, Symantec Corp., p. 2, 7, 17, 22, 53, 68, 69, 101-106, 156, 244, 370.*

(Continued)

*Primary Examiner* — Khanh Pham
(74) *Attorney, Agent, or Firm* — Rory D. Rankin; Meyertons, Hood, Kivlin, Kowert & Goetzel, P.C.

(57) ABSTRACT

A method and mechanism for performing data backups in a computing system. A "delta" catalog is utilized for the maintenance of data backups. The delta catalog includes a backed up object table and an extent map. For a given backup, the backed up object table update stores entries which identify only those objects backed up during that backup. The backed up object table is further configured to store entries which identify objects which were deleted between the time of a prior backup procedure and a current backup procedure. The extent map is configured identify all objects present in the system at the time of a particular backup. The extent map identifies the objects which were present as one or more sequences of entries in the backed up object table.

20 Claims, 11 Drawing Sheets

OTHER PUBLICATIONS

Florentino, "Norton Ghost and Norton Save & Restore(tm)", Retrieved Feb. 3, 2007, p. 1. <http://retailaccess.com/symantec./pdfs/Ghost_NSR_Comparison.pdf>.*

Traveling Software, "Laplink V User's Guide", Dec. 1993, p. ii,4-7,122-123,130-131.*

Murphy, "Backup Strategy", Feb. 1996, Linux Journal, Specialized Systems Consultants, p. 1-5, <Retrieved from ACM Portal on Jan. 17, 2008>.*

Dantz Development Corporation, "Retrospect User's Guide", Apr. 8, 2003, Version 6.5, p. 1-297.*

OED.com, definition of "first" adj., Dec. 2006, Oxford University Press, p. 1-26. <Retrieved from OED.com on Sep. 4, 2008>.*

OED.com, definition of "prior" adj., Jun. 2008, Oxford University Press, p. 1-5, <Retrieved from OED.com on Sep. 4, 2008>.*

* cited by examiner

Backup Table 230

| Backup ID 231 | Time 232 |
|---|---|
| 1 | Time 1 |

Object Table 240

| Object ID 241 | Name 242 | Parent 243 |
|---|---|---|
| 1 | Test | <NULL> |
| 2 | DirA | 1 |
| 3 | File1.txt | 2 |
| 4 | File2.txt | 2 |
| 5 | File3.txt | 2 |
| 6 | DirB | 1 |
| 7 | File4.txt | 6 |
| 8 | File5.txt | 6 |
| 9 | File6.txt | 6 |
| 10 | DirC | 1 |
| 11 | File7.txt | 10 |
| 12 | File8.txt | 10 |
| 13 | File9.txt | 10 |

Fig. 3A

Backed Up Object Table 250

| Backup ID 251 | Index 252 | Object ID 253 | Create Time 254 | Modify Time 255 | Deleted 256 |
|---|---|---|---|---|---|
| 1 | 1 | 1 | Time 0 | Time 0 | |
| 1 | 2 | 2 | Time 0 | Time 0 | |
| 1 | 3 | 3 | Time 0 | Time 0 | |
| 1 | 4 | 4 | Time 0 | Time 0 | |
| 1 | 5 | 5 | Time 0 | Time 0 | |
| 1 | 6 | 6 | Time 0 | Time 0 | |
| 1 | 7 | 7 | Time 0 | Time 0 | |
| 1 | 8 | 8 | Time 0 | Time 0 | |
| 1 | 9 | 9 | Time 0 | Time 0 | |
| 1 | 10 | 10 | Time 0 | Time 0 | |
| 1 | 11 | 11 | Time 0 | Time 0 | |
| 1 | 12 | 12 | Time 0 | Time 0 | |
| 1 | 13 | 13 | Time 0 | Time 0 | |

Extent Map 260

| Backup ID 261 | Start Number 262 | Count 263 | Source Backup 264 | Source Index 265 |
|---|---|---|---|---|
| 1 | 1 | 13 | 1 | 1 |

Fig. 3B

Backup Table 230

| Backup ID 231 | Time 232 |
|---|---|
| 1 | Time 1 |
| 2 | Time 3 |

233

Object Table 240

| Object ID 241 | Name 242 | Parent 243 |
|---|---|---|
| 1 | Test | <NULL> |
| 2 | DirA | 1 |
| 3 | File1.txt | 2 |
| 4 | File2.txt | 2 |
| 5 | File3.txt | 2 |
| 6 | DirB | 1 |
| 7 | File4.txt | 6 |
| 8 | File5.txt | 6 |
| 9 | File6.txt | 6 |
| 10 | DirC | 1 |
| 11 | File7.txt | 10 |
| 12 | File8.txt | 10 |
| 13 | File9.txt | 10 |
| 14 | File10.txt | 1 |

Backed Up Object Table 450

| Backup ID 451 | Index 452 | Object ID 453 | Create Time 454 | Modify Time 455 | Backed Up 456 |
|---|---|---|---|---|---|
| 1 | 1 | 1 | Time 0 | Time 0 | True |
| 1 | 2 | 2 | Time 0 | Time 0 | True |
| 1 | 3 | 3 | Time 0 | Time 0 | True |
| 1 | 4 | 4 | Time 0 | Time 0 | True |
| 1 | 5 | 5 | Time 0 | Time 0 | True |
| 1 | 6 | 6 | Time 0 | Time 0 | True |
| 1 | 7 | 7 | Time 0 | Time 0 | True |
| 1 | 8 | 8 | Time 0 | Time 0 | True |
| 1 | 9 | 9 | Time 0 | Time 0 | True |
| 1 | 10 | 10 | Time 0 | Time 0 | True |
| 1 | 11 | 11 | Time 0 | Time 0 | True |
| 1 | 12 | 12 | Time 0 | Time 0 | True |
| 1 | 13 | 13 | Time 0 | Time 0 | True |
| 2 | 1 | 1 | Time 0 | Time 0 | |
| 2 | 2 | 2 | Time 0 | Time 0 | |
| 2 | 3 | 3 | Time 0 | Time 0 | |
| 2 | 4 | 4 | Time 0 | Time 0 | |
| 2 | 5 | 5 | Time 0 | Time 0 | |
| 2 | 6 | 10 | Time 0 | Time 0 | |
| 2 | 7 | 11 | Time 0 | Time 0 | |
| 2 | 8 | 12 | Time 0 | Time 0 | |
| 2 | 9 | 13 | Time 0 | Time 2 | True |
| 2 | 10 | 14 | Time 2 | Time 2 | True |

Backed Up Object Table 250

| Backup ID 251 | Index 252 | Object ID 253 | Create Time 254 | Modify Time 255 | Deleted 256 |
|---|---|---|---|---|---|
| 1 | 1 | 1 | Time 0 | Time 0 | |
| 1 | 2 | 2 | Time 0 | Time 0 | |
| 1 | 3 | 3 | Time 0 | Time 0 | |
| 1 | 4 | 4 | Time 0 | Time 0 | |
| 1 | 5 | 5 | Time 0 | Time 0 | |
| 1 | 6 | 6 | Time 0 | Time 0 | |
| 1 | 7 | 7 | Time 0 | Time 0 | |
| 1 | 8 | 8 | Time 0 | Time 0 | |
| 1 | 9 | 9 | Time 0 | Time 0 | |
| 1 | 10 | 10 | Time 0 | Time 0 | |
| 1 | 11 | 11 | Time 0 | Time 0 | |
| 1 | 12 | 12 | Time 0 | Time 0 | |
| 1 | 13 | 13 | Time 0 | Time 0 | |
| 2 | 1 | 14 | Time 2 | Time 2 | |
| 2 | 2 | 6 | Time 0 | Time 2 | True |
| 2 | 3 | 13 | Time 0 | Time 2 | |

257

Extent Map 260

| Backup ID 261 | Start Number 262 | Count 263 | Source Backup 264 | Source Index 265 |
|---|---|---|---|---|
| 1 | 1 | 13 | 1 | 1 |
| 2 | 1 | 5 | 1 | 1 |
| 2 | 6 | 1 | 2 | 1 |
| 2 | 7 | 3 | 1 | 10 |
| 2 | 10 | 1 | 2 | 3 |

Backup Table 230

| Backup ID 231 | Time 232 |
|---|---|
| 1 | Time 1 |
| 2 | Time 3 |
| 3 | Time 5 |

502

Object Table 240

| Object ID 241 | Name 242 | Parent 243 |
|---|---|---|
| 1 | Test | <NULL> |
| 2 | DirA | 1 |
| 3 | File1.txt | 2 |
| 4 | File2.txt | 2 |
| 5 | File3.txt | 2 |
| 6 | DirB | 1 |
| 7 | File4.txt | 6 |
| 8 | File5.txt | 6 |
| 9 | File6.txt | 6 |
| 10 | DirC | 1 |
| 11 | File7.txt | 10 |
| 12 | File8.txt | 10 |
| 13 | File9.txt | 10 |
| 14 | File10.txt | 1 |
| 15 | DirD | 1 |
| 16 | File11.txt | 15 |
| 17 | File12.txt | 15 |
| 18 | File13.txt | 15 |

Backed Up Object Table 450

| Backup ID 451 | Index 452 | Object ID 453 | Create Time 454 | Modify Time 455 | Backed Up 456 |
|---|---|---|---|---|---|
| 1 | 1 | 1 | Time 0 | Time 0 | True |
| 1 | 2 | 2 | Time 0 | Time 0 | True |
| 1 | 3 | 3 | Time 0 | Time 0 | True |
| 1 | 4 | 4 | Time 0 | Time 0 | True |
| 1 | 5 | 5 | Time 0 | Time 0 | True |
| 1 | 6 | 6 | Time 0 | Time 0 | True |
| 1 | 7 | 7 | Time 0 | Time 0 | True |
| 1 | 8 | 8 | Time 0 | Time 0 | True |
| 1 | 9 | 9 | Time 0 | Time 0 | True |
| 1 | 10 | 10 | Time 0 | Time 0 | True |
| 1 | 11 | 11 | Time 0 | Time 0 | True |
| 1 | 12 | 12 | Time 0 | Time 0 | True |
| 1 | 13 | 13 | Time 0 | Time 0 | True |
| 2 | 1 | 1 | Time 0 | Time 0 | |
| 2 | 2 | 2 | Time 0 | Time 0 | |
| 2 | 3 | 3 | Time 0 | Time 0 | |
| 2 | 4 | 4 | Time 0 | Time 0 | |
| 2 | 5 | 5 | Time 0 | Time 0 | |
| 2 | 6 | 10 | Time 0 | Time 0 | |
| 2 | 7 | 11 | Time 0 | Time 0 | |
| 2 | 8 | 12 | Time 0 | Time 0 | |
| 2 | 9 | 13 | Time 0 | Time 2 | True |
| 2 | 10 | 14 | Time 2 | Time 2 | True |
| 3 | 1 | 1 | Time 0 | Time 0 | |
| 3 | 2 | 2 | Time 0 | Time 0 | |
| 3 | 3 | 3 | Time 0 | Time 0 | |
| 3 | 4 | 4 | Time 0 | Time 0 | |
| 3 | 5 | 5 | Time 0 | Time 0 | |
| 3 | 6 | 10 | Time 0 | Time 0 | |
| 3 | 7 | 12 | Time 0 | Time 0 | |
| 3 | 8 | 13 | Time 0 | Time 0 | |
| 3 | 9 | 15 | Time 4 | Time 4 | True |
| 3 | 10 | 16 | Time 4 | Time 4 | True |
| 3 | 11 | 17 | Time 4 | Time 4 | True |
| 3 | 12 | 18 | Time 4 | Time 4 | True |

Backed Up Object Table 250

| Backup ID 251 | Index 252 | Object ID 253 | Create Time 254 | Modify Time 255 | Deleted 256 |
|---|---|---|---|---|---|
| 1 | 1 | 1 | Time 0 | Time 0 | |
| 1 | 2 | 2 | Time 0 | Time 0 | |
| 1 | 3 | 3 | Time 0 | Time 0 | |
| 1 | 4 | 4 | Time 0 | Time 0 | |
| 1 | 5 | 5 | Time 0 | Time 0 | |
| 1 | 6 | 6 | Time 0 | Time 0 | |
| 1 | 7 | 7 | Time 0 | Time 0 | |
| 1 | 8 | 8 | Time 0 | Time 0 | |
| 1 | 9 | 9 | Time 0 | Time 0 | |
| 1 | 10 | 10 | Time 0 | Time 0 | |
| 1 | 11 | 11 | Time 0 | Time 0 | |
| 1 | 12 | 12 | Time 0 | Time 0 | |
| 1 | 13 | 13 | Time 0 | Time 0 | |
| 2 | 1 | 14 | Time 2 | Time 2 | |
| 2 | 2 | 6 | Time 0 | Time 2 | True |
| 2 | 3 | 13 | Time 0 | Time 2 | |
| 3 | 1 | 14 | Time 4 | Time 4 | True |
| 3 | 2 | 13 | Time 4 | Time 4 | True |
| 3 | 3 | 15 | Time 4 | Time 4 | |
| 3 | 4 | 16 | Time 4 | Time 4 | |
| 3 | 5 | 17 | Time 4 | Time 4 | |
| 3 | 6 | 18 | Time 4 | Time 4 | |

558

Extent Map 260

| Backup ID 261 | Start Number 262 | Count 263 | Source Backup 264 | Source Index 265 |
|---|---|---|---|---|
| 1 | 1 | 13 | 1 | 1 |
| 2 | 1 | 5 | 1 | 1 |
| 2 | 6 | 1 | 2 | 1 |
| 2 | 7 | 3 | 1 | 10 |
| 2 | 10 | 1 | 2 | 3 |
| 3 | 1 | 5 | 1 | 1 |
| 3 | 6 | 3 | 1 | 10 |
| 3 | 9 | 4 | 3 | 3 |

DELTA CATALOGS IN A BACKUP SYSTEM

BACKGROUND OF THE INVENTION

1. Field of the Invention

The invention relates to computing systems and, more particularly, to file system catalogs.

2. Description of the Related Art

As is well known, file system backups in computing systems may take a considerable amount of time and storage space. In many file systems, a significant portion of the data is not changed after its creation or after an initial period of access. Generally speaking, the conventional approach to data backup includes periodically performing a full backup of everything in the file system, for example once a week or once a month, and performing incremental backups between full backups, for example every day. Typically, this conventional approach makes a copy of all of the data in the file system, even though a large percentage of that data may not have changed since the previous full backup. Consequently, using the conventional approach, data may be backed up on a full backup even though one or more copies of that data may already exist on previous full backups. In order to perform a restore from a previous backup, a most current full backup is typically restored, and then any changed data since the full backup is restored from incremental backups performed subsequent to the current full backup.

One alternative for improving the performance of backups is to utilize an approach sometimes referred to as "synthetic full backups". In a synthetic backup, instead of performing a full backup by backing up all of the data on a file system, a copy of a previous full backup is used to determine which portions of the file system will be included in the backup. For example, data that has been deleted from the file system since the last full backup are subtracted from the full backup and data that is new or has changed on the file system are added to the full backup. In this manner, a new "synthetic" full backup is generated.

As noted above, incremental backups may be utilized to backup changes to data since the last full backup. Such an approach may have the advantage of only backing up files that are new or files that have changed since the last backup. However, in order to provide a true image restore (i.e., to restore only files that existed at the time of the incremental backup) or to create a synthetic full restore (i.e., an image that is equivalent to a full taken at the time of the incremental), the exact "state" of the file system at the time of the incremental must be preserved. Catalogs which are used for incremental backups that are used for true Image restore or synthetic full images may generally require the same amount of disk space as a normal full backup. Consequently, backups for large file systems which utilize incremental backups may entail very large catalogs. For example, catalogs for some large file systems may exceed 500 GB. Because of the significant storage space required for these catalogs, an enterprise may be reluctant to use features (e.g., true image restore or synthetics backups) which would generate large catalogs.

Accordingly, an efficient method and mechanism for managing data backups and restores is desired.

SUMMARY OF THE INVENTION

A method and mechanism for performing data backups in a computing system are contemplated. A "delta" catalog is utilized for the maintenance of data backups. In one embodiment, the delta catalog includes a backed up object table and an extent map. The backed up object table is configured to store entries which identify only those objects backed up during a particular backup procedure. In addition, the backed up object table is configured to store entries which identify objects which were deleted subsequent to a prior backup procedure. The extent map is configured identify all objects present in the system at the time of a particular backup. The extent map identifies the objects which were present as one or more sequences of entries in the backed up object table.

Also contemplated is a delta catalog with a backed up object table including entries which identify a particular backup procedure, provide an index for each entry of a particular backup procedure, and provide an object identifier which identifies a particular object. In addition, the extent map may further identify a source backup identifier which identifies one or more entries of a particular back up procedure recorded in the backed up object table, and a source index which identifies a particular entry of those entries.

In addition, an object table may be maintained which provides a unique identifier for each object identified over the course of one or more backup procedures. The unique identifier provided may be used as references in the backed up object table.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
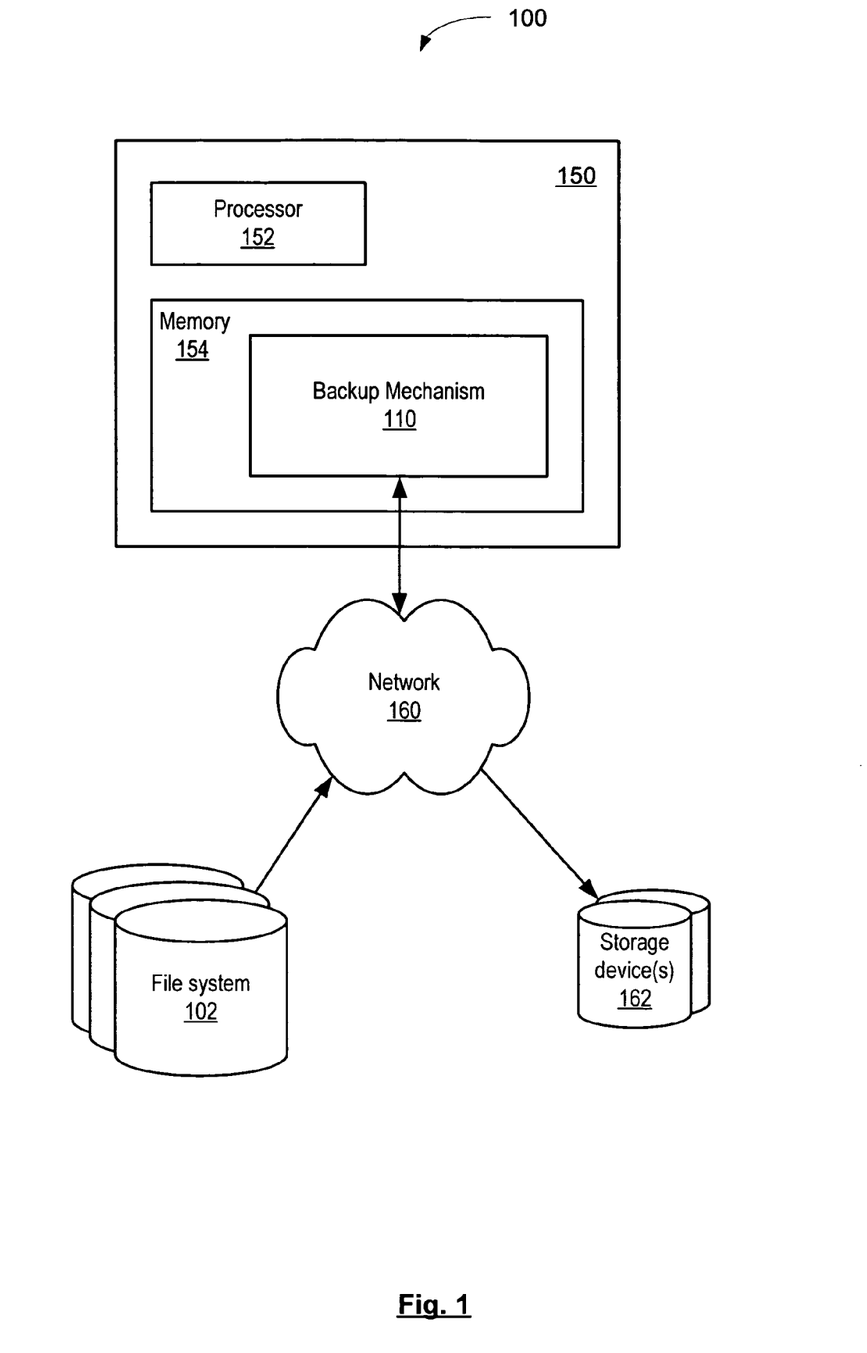
FIG. 1 depicts one embodiment of a computing system.

FIG. 1 depicts one embodiment of a computing system 100 configured to perform data backups. In the example shown, system 150 may be any of various types of devices, including, but not limited to, a personal computer system, desktop computer, laptop or notebook computer, mainframe computer system, workstation, network computer, or other suitable device. System 150 may include at least one processor 152. The processor 152 may be coupled to a memory 154. Memory 154 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 150 may be coupled via a network 160 to one or more storage devices on which a file system 102 may be implemented and one or more backup devices 162. Network 160 may be, for example, a Storage Area Network (SAN), a LAN with Network-Attached Storage (NAS), or any network capable of coupling devices to a system 150. The storage devices may include any of one or more types of storage devices including, but not limited to, stand-alone storage devices ("disks"), storage systems such as RAID (Redundant Array of Independent Disks) systems, disk arrays, and JBODs (Just a Bunch Of Disks, used to refer to disk cabinets that do not have a built-in RAID controller). Backup devices 162 may include any of one or more types of backup devices, including, but not limited to, various types of tape devices and optical storage devices.

Network 160 may include one or more other networks, including wired or wireless networks, and may be coupled to one or more other devices (not shown) that may include one or more applications for accessing file system 102.

In the embodiment shown, memory 154 includes a backup mechanism 110. Backup mechanism may, for example, comprise software which includes executable program code configured to perform backup and/or restore operations. In alternative embodiments, backup mechanism 110 may comprise hardware and/or software. Backup mechanism 110 may back up data from file system 102 to backup media on one or more backup devices 162 according to a user-defined schedule. In addition to backing up data, metadata associated with data may also be stored. For example, a catalog(s) which identifies data which is backed up may also be stored. Such a catalog may be useful for not only identifying data which has been backed up, but for restoring a previous state of the data (e.g., a state of the file system) as well.

In one embodiment, system 150 is configured to create a "delta" catalog in association with backed up data. As part of the delta catalog, an extent map is created which points to or otherwise identifies entries for current and previous backups. In addition, the delta catalog includes information which identifies objects which are new as compared to the most recent backup, objects which have changed or been modified, and objects that have been deleted. The information which identifies objects may include attributes such as a time modified, time of creation, and any other information deemed suitable.

As noted above, an application which seeks to create a synthetic full or to restore a system to it exact state at the time of a backup needs to "know" exactly which files were on the system when the backup was performed. In the absence of a mechanism as described herein, saving a list of the files that were on the system at the time of the backup may generally require an entry for every object on the system. Utilizing the delta mechanism described herein, only additions, changes, and deletions between a current backup and a previous backup are recorded along with an extent map. Consequently, instead of recording every object, a relatively small number of changes need be recorded.

Figure 2:
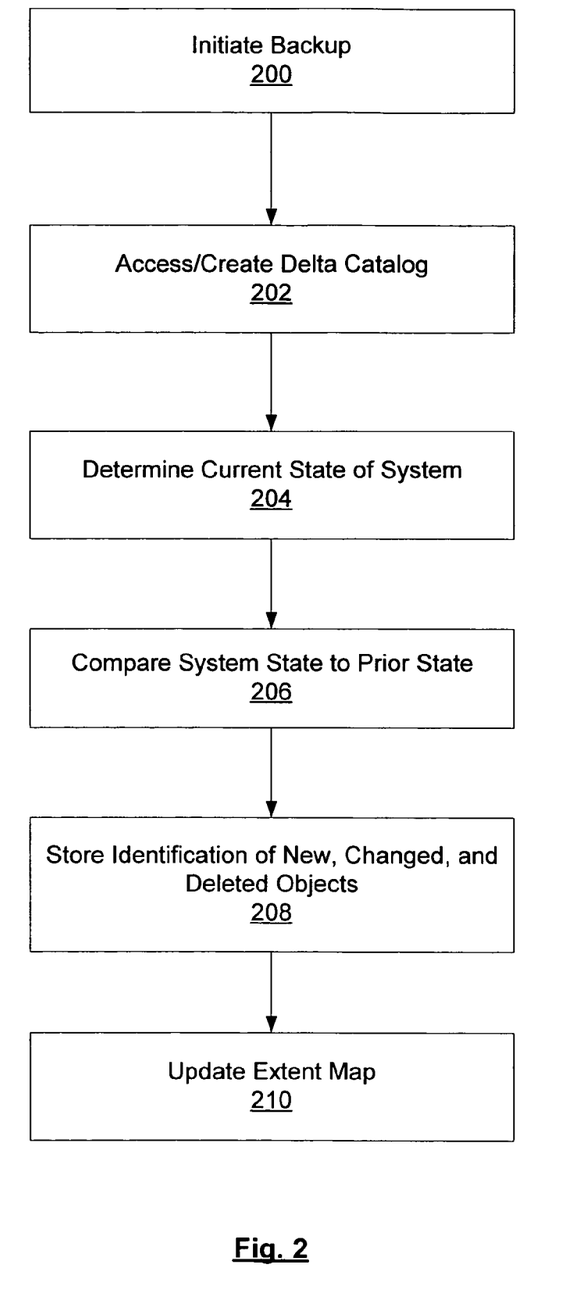
FIG. 2 depicts one embodiment of a method for performing data backup.

Turning now to FIG. 2, an overview of one embodiment of a method for performing data backup is illustrated. Subsequent to initiating a backup (block 200), a previously stored backup delta catalog is accessed (block 202). In the event there is no prior corresponding catalog, a new catalog is created. A previously stored catalog may be used to determine the state of the system at the time of the backup which corresponds to the catalog. The current state of the system is then determined (block 204). Generally speaking, determining the current state of the system may entail identifying and examining the objects within the system which are to be backed up. A comparison of the current state of the system is then made to the state of the system as indicated by the previous catalog (block 206). Based upon this comparison, differences between the current state of the system and the state of the system as represented by the catalog may be determined. For example, object additions, objection modifications, and object deletions may be identified and stored (block 208) in an updated catalog. In addition, an extent map corresponding to the catalog is updated (block 210) to reflect the new backup. Further details concerning the above described method will be described in the following discussion.

In the following, a number of examples are provided to further illustrate the above described delta catalog method and mechanism. For purposes of discussion, a new file system is assumed in which no objects to be backed up are present. At an initial point in time, TIME 0, the following changes are made to the system:

| TIME 0 - File and Directory objects added to system | |
|---|---|
| Add | /test |
| Add | /test/DirA |
| Add | /test/DirA/File1.txt |
| Add | /test/DirA/File2.txt |
| Add | /test/DirA/File3.txt |
| Add | /test/DirB/File4.txt |
| Add | /test/DirB/File5.txt |
| Add | /test/DirB/File6.txt |
| Add | /test/DirC/File7.txt |
| Add | /test/DirC/File8.txt |
| Add | /test/DirC/File9.txt |

In the above, it is seen that a /test directory is created with three subdirectories—DirA, DirB, and DirC. In addition, three files are added to each of the subdirectories. At a later point in time, TIME 1, a backup of the data objects is performed. The listing below indicates the files on the system at the time of the backup.

Figure 3A:
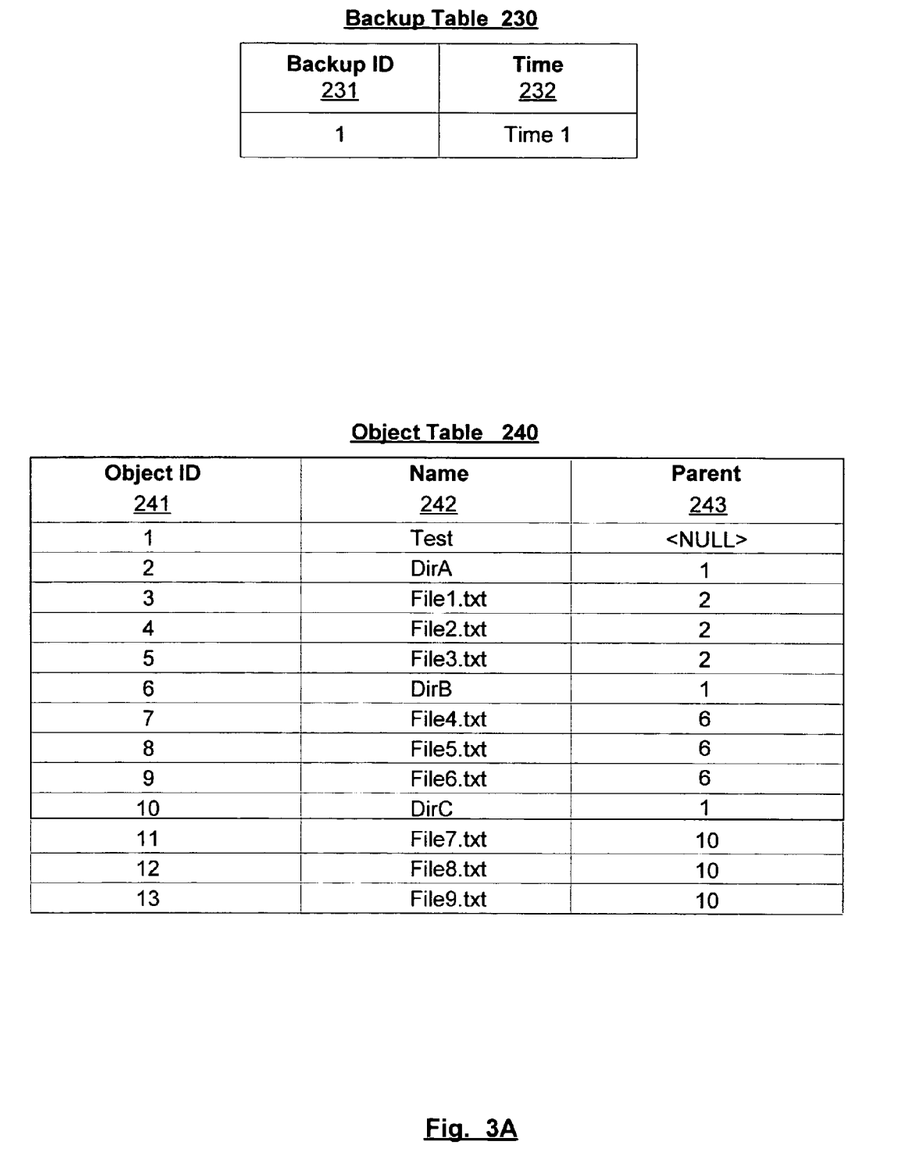
FIG. 3A depicts one embodiment of a backup table and object table.
Figure 3B:
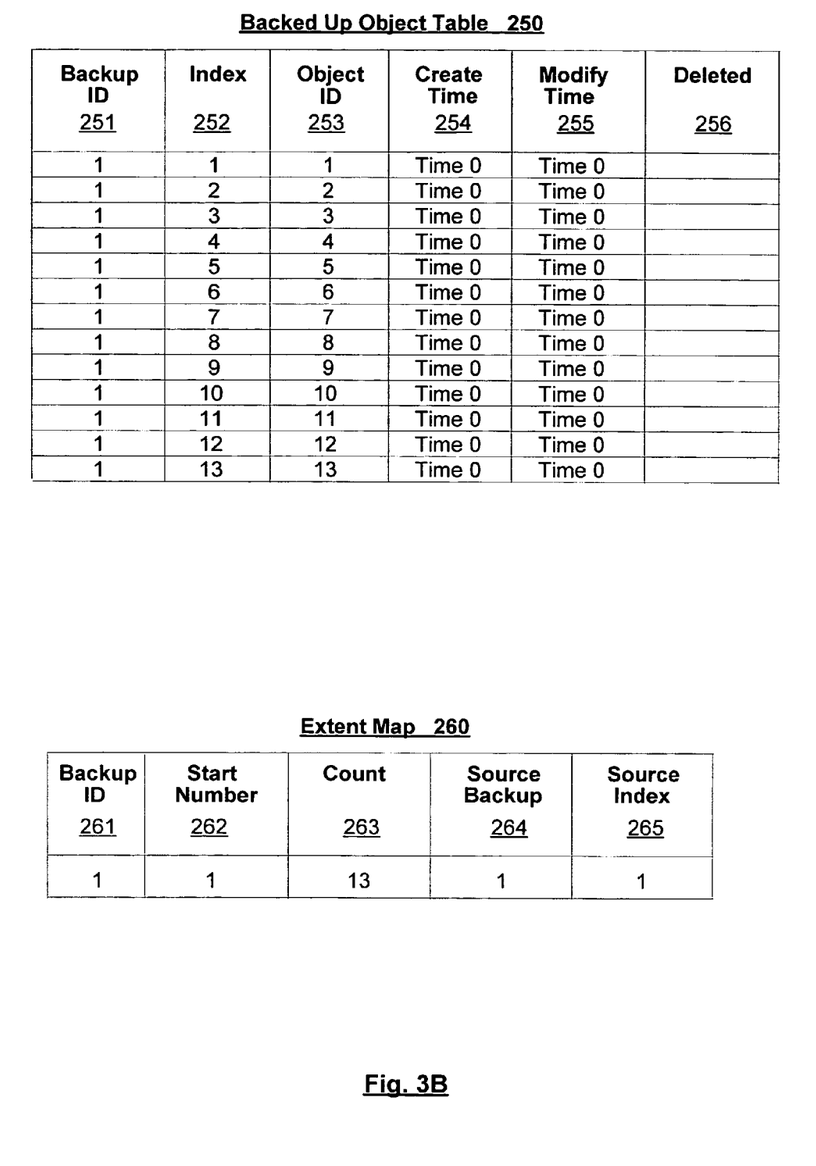
FIG. 3B depicts one embodiment of a backed up object table and extent map.

TIME 1—First Backup is Taken
(Files on system at time of first backup listed below)
 /test
 /test/DirA
 /test/DirA/File1.txt
 /test/DirA/File2.txt
 /test/DirA/File3.txt
 /test/DirB//test/DirB/File4.txt
 /test/DirB/File5.txt
 /test/DirB/File6.txt
 /test/DirC//test/DirC/File7.txt
 /test/DirC/File8.txt
 /test/DirC/File9.txt FIGS. 3A and 3B illustrates one embodiment of a delta catalog which is created as part of the first backup at TIME 1. FIG. 3A illustrates a backup table 230 and an object table 240. Backup table 230 includes information which identifies a particular backup, Backup ID 231, and a time at which a particular backup was performed, Time 232. In the example shown, the first row of the backup table 230 shows the first backup with a backup ID of "1" was performed at Time 1.

In addition to the backup table, an object table 240 is included which identifies objects in the system which have been backed up. In the example shown, each object listed in the table 240 includes an Object ID 241, a Name 242, and a Parent 243. The Parent indication 243 may generally be used to indicate a relationship between various objects in the table 240. For example, as noted above, a "root"/test directory was created with three subdirectories. Accordingly, table 240 shows a Test object with an Object ID of 1 has a parent indication of <NULL>. In this case, the <NULL> parent indication indicates the Test object is not a child of another object listed in the table 240. However, the three subdirectories of /test are identified in the table 240 as Object ID 2 (DirA), Object ID 6 (DirB), and Object ID 10 (DirC). Each of these subdirectories are identified as having a parent whose Object ID is 1 (i.e., Test). In this manner, relationships between the objects in the table 240 may be indicated.

Generally speaking, while the table 240 may generally identify all objects backed up after the first backup, table 240 is not generally intended to indicate objects which have been backed up during a particular backup. Rather, as illustrated in FIG. 3B, a Backed Up Object Table 250 may be utilized which identifies objects backed up during a particular backup procedure. Of course, it is to be understood, that the data in a delta catalog may be stored in any of a number of ways. However, for purposes of discussion, various tables are illustrated to better understand the logical relationships between the various types and portions of data.

Backed Up Object Table 250 includes six columns corresponding to various information for a backed up object, and a row for each of the backed up objects. The first column, Backup ID 251, identifies a particular backup by an ID similar to that of Backup Table 230. The second column, Index 252, provides an index which identifies a particular entry in the Backed Up Object Table 250. A third column, Object ID 253, includes the Object ID of a particular object. The Object ID included in column 253 may be cross-referenced with Object Table 240 to determine further information regarding a particular object. For example, the first entry in table 250 has an Object ID of "1" which is identified as the "Test" object in table 240. Columns 254 and 255 of table 250 provide a time of creation and modification (if any), respectively, for an object. Finally, column 256 ("Deleted") provides an indication as to whether a particular object has been deleted.

FIG. 3B illustrates an extent map 260 which corresponds to the Backed Up Object Table 250. Extent Map 260 may generally be used to provide a condensed representation of the state of the system (e.g., the objects currently present on the system) at the time of a particular backup. In the example of FIG. 3B, a single entry (row) is shown which corresponds to the single backup which has been performed as discussed above. The first column, Backup ID 261, identifies a particular backup. The second column, Start Number 262, provides an ordinal corresponding to a particular object in a sequence of one or more objects representative of the state of the system at the time of the backup. In other words, if the state of the system at the time of a particular backup included thirteen objects, such objects may be enumerated as the sequence 1-13. Therefore, in the example shown, the Start Number 262 is shown to be "1" which may be interpreted to refer to the first object which is currently being identified in the extent map entry. By combining the Start Number 262 indication with the Count 263 indication shown, multiple objects may be identified. Count 263 may then be seen to identify how many objects are in a currently identified sequence. In the present example, the Count 263 is "13". Therefore, this particular extent map entry is referring to object 1-13.

It is noted that the ordinals 1-13 themselves do not necessarily identify any particular objects. Rather, these ordinals may be viewed as making reference to the first 13 objects to be identified. Then, by reference to the Backed Up Column Table 250, columns 264 and 265 may then be used to actually identify the particular objects which correspond to these thirteen objects. The Source backup 264 column includes a Backup ID which refers to a previous backup. The Source Index column 265 identifies a particular index of that backup. Therefore, the extent map entry shown identifies backup "1" and source index "1". Referring to the Backed Up Object Table 250, backup "1" may be identified by the Backup ID 251 column and source index "1" may be identified by the Index column 252 entry within that particular backup. As there has only been a single backup at this point in time, all entries in the Backed Up Object Table 250 correspond to backup "1" and the first index is "1". Therefore, the first object identified by the extent map corresponds to index "1" of backup "1" in the table 250. In addition, as the Extent Map 260 has indicated a contiguous sequence of thirteen objects (1-13), the sequence of thirteen objects identified in backup "1" of the table 250 are identified. Based upon this information, and cross-reference to the Object Table 240, all objects present on the system at the time of the first backup can be determined.

Assume now at a subsequent point in time, TIME 2, the following changes are made to the system:

| TIME 2 - Changes | |
|---|---|
| Add | /test/DirA/File10.txt |
| Delete | /test/DirB/ |
| Modify | /test/DirC/File9.txt |

In this example, a new file (file10.txt) has been added to /DirA, /DirB has been deleted, and File9.txt has been modified. Following these changes an incremental backup is performed at TIME 3.

| TIME 3 - Second backup is taken (INCREMENTAL) (Files on system at time of incremental backup listed below) |
|---|
| /test |
| /test/DirA |
| /test/DirA/File1.txt |
| /test/DirA/File2.txt |
| /test/DirA/File3.txt |
| /test/DirA/File10.txt (Created - Time 2) |
| /test/DirC/ |
| /test/DirC/File7.txt |
| /test/DirC/File8.txt |
| /test/DirC/File9.txt (Modified - Time 2) |

Figure 4A:
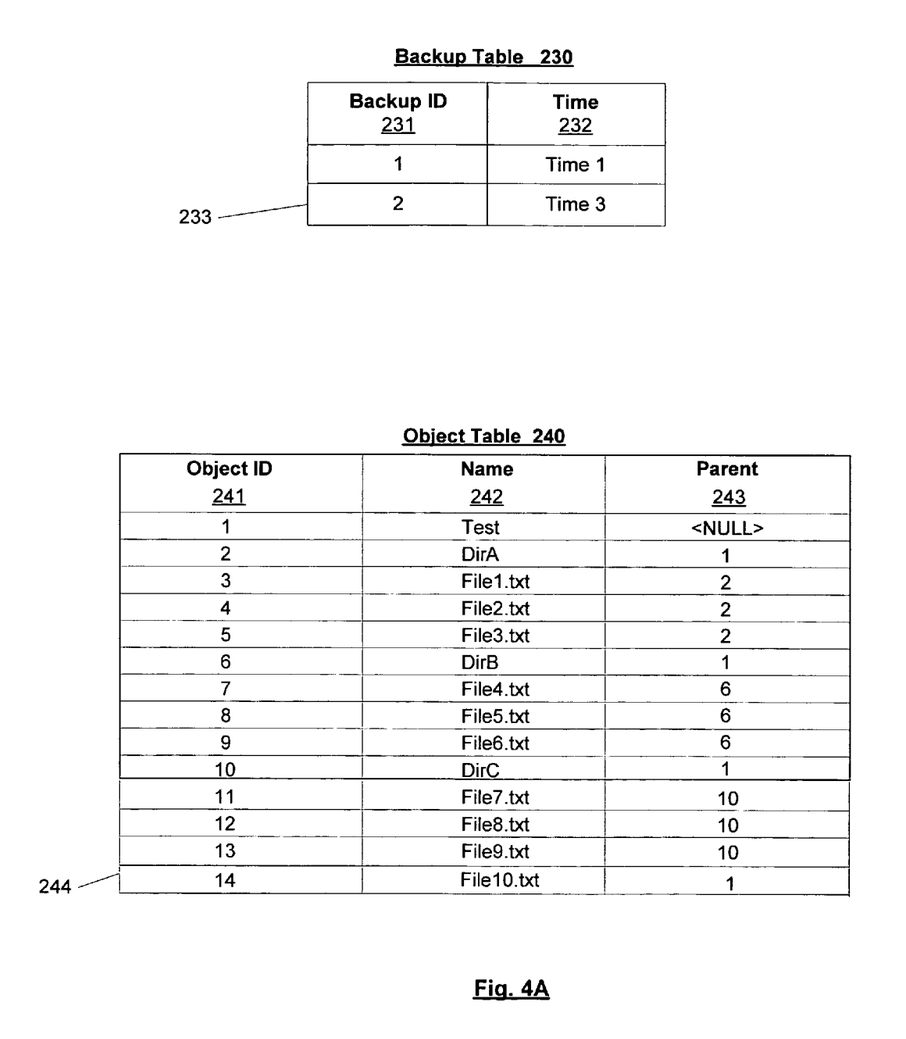
FIG. 4A depicts one embodiment of a backup table and object table.

FIG. 4A illustrates Backup Table 230 and Object Table 240 subsequent to the backup at TIME 3. As seen in the example, Table 230 includes a new entry 233 which identifies a second backup (Backup ID 2) was performed at Time 3. Object Table 240 has been updated to reflect the addition of a new object 244 (File10.txt) with Object ID "14".

Figure 4B:
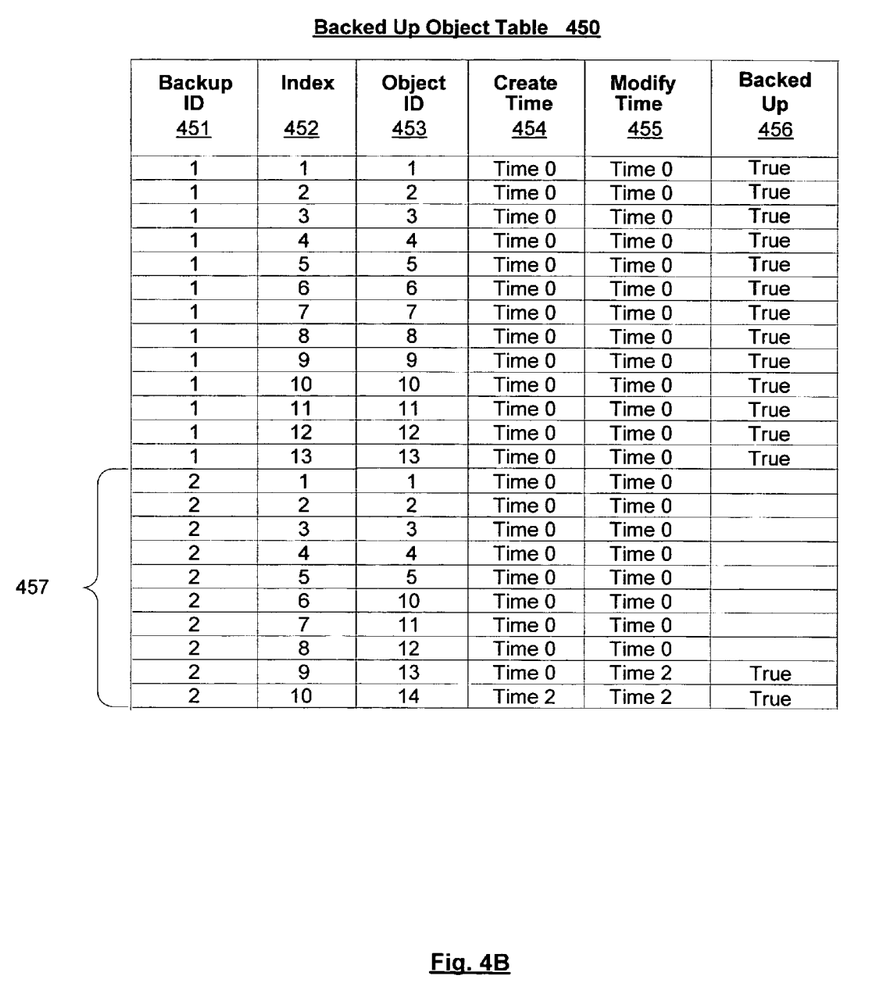
FIG. 4B depicts one embodiment of a table in a non-delta catalog approach.

Turning now to FIG. 4B, one example of a Backed Up Object Table 450 is illustrated. Backed Up Object Table 450 represents an example of a non-delta catalog approach. Table 450 includes columns similar to that of Backed Up Object Table 250—including a Backup ID 451, and Index 452, and Object ID 453, a Create Time 454, and a Modify Time 455. In addition, a Backed Up column 456 indicates whether a particular object was backed up during the corresponding backup. For example, all thirteen objects corresponding to Backup ID "1" are identified as having been backed up during that backup. In addition, Table 450 lists every object in the system at the time of a particular backup. As shown by entries 457, the second backup is identified by Backup ID "2" and includes ten objects which are indexed 1-10. As noted by the Object ID column 453, only those objects with ID's of 1-5 and 10-14 are indicated as being present at the time of the second backup. The absence of object ID's 6-9 reflects that fact that DirB, as well as its contents, was deleted prior to the second backup. These deleted objects may be identified by Object Table 240.

Also noted from entries 457 is a new object corresponding to Object ID 14 which corresponds to File10.txt which was added. This new object, with index "10", indicates both a creation and modification time of Time 2. In addition, the entry indexed as "9" shows a creation time of Time 0 and a modification time of Time 2. This object, with Object ID 13, may be identified from the Object Table 250 as File9.txt which was modified prior to the backup. Also seen from the entries 457 for the second backup procedure is an indication that only the last two entries (indexed 9 and 10) were backed up during the second backup. The remaining objects identified in entries 457 represent objects which were neither new nor modified prior to the backup. Therefore, these remaining objects were not backed up again during the second backup procedure.

Figure 4C:
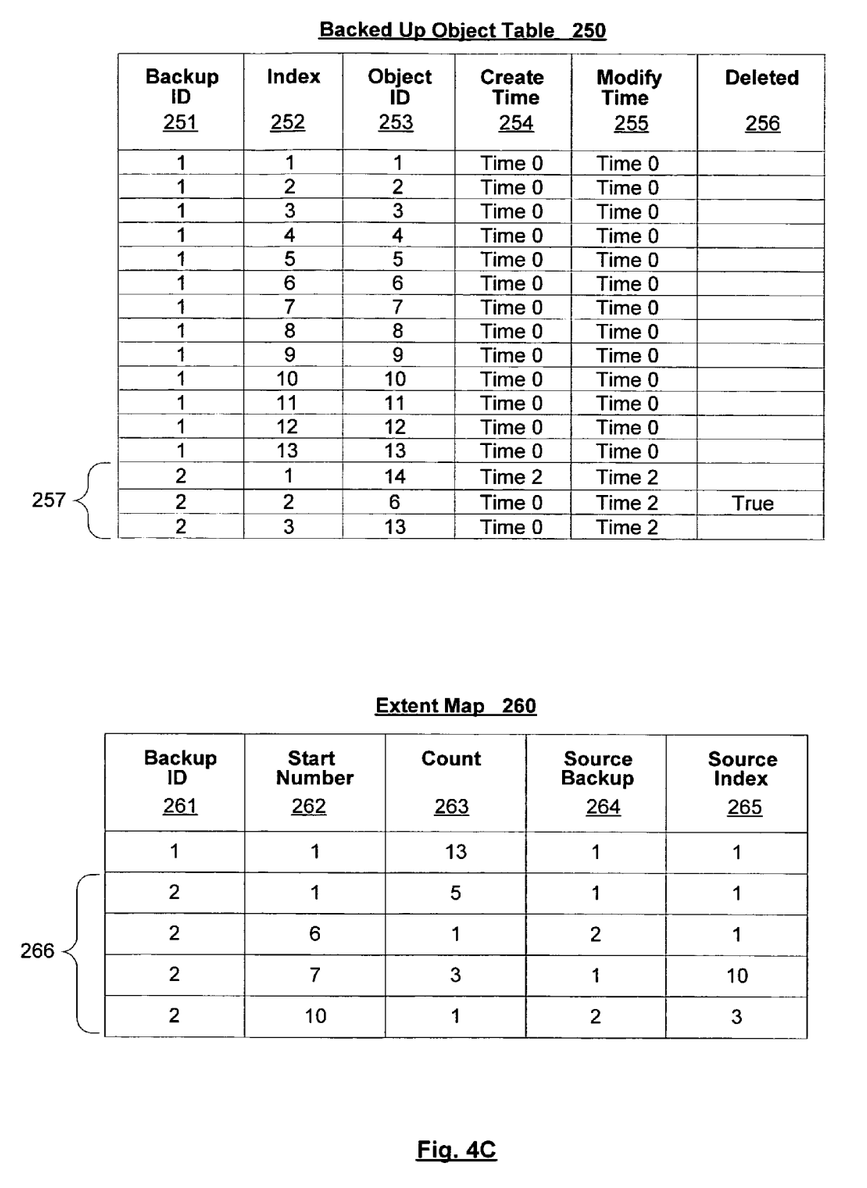
FIG. 4C depicts one embodiment of a backed up object table and extent map.

In contrast to FIG. 4A, FIG. 4B depicts an embodiment utilizing a delta catalog approach. Generally speaking, FIG. 4C shows both Table 250 and Extent Map 260 subsequent to the second backup procedure. In this embodiment, Backed Up Object Table 250 includes three new entries 257. The first of these three entries 257 has an Object ID of "14" and corresponds to the newly added object File10.txt. The second entry has an Object ID of "6" which corresponds to DirB in the Object Table 240. This second entry also includes an indication 256 that the corresponding object was deleted. In one embodiment, the deletion of an object may be determined by examining the backup catalog to determine the state of the system at a prior point in time. By comparing the objects currently on the system to the state of the system at the prior time, deleted objects may be determined. Finally, the third entry of entries 257 is identified as Object ID "13" which corresponds to File9.txt which was modified.

In this delta catalog approach, the Extent Map 260 is also utilized as shown in FIG. 4C. In this case, the Map 260 has been updated with four new entries 266 which correspond to the second backup procedure. As noted, each of the entries 266 are identified as corresponding to Backup ID "2". As previously discussed, Extent Map 260 may be utilized to indicate the state of the system at the time of a particular backup. Therefore, entries 266 indicate those objects present on the system at the time of the second backup. The first entry of entries 266 identifies objects 1-5 (Start Number=1 and Count=5). The identification of these five objects is taken from Source Backup "1" (i.e., the backup with an ID of "1") and begins with the Source Index "1" (i.e., the object within backup "1" with an index of "1"). By reference to the Table 250 of FIG. 4C, the object with index of "1" within the first backup is identified and beginning with that index five sequential objects are identified. Therefore, those objects with Object IDs 1-5 in the backup with ID of "1" are identified as having been present on the system at the time of the second backup.

The second entry of entries 266 in the Extent Map 260 identifies a sixth object (i.e., Start Number=1 and Count=1). This object is identified as having a Source Index of "1" in the backup with Backup ID of "2". By reference to Table 250 in FIG. 4C, the object with an index of "1" in the second backup is identified as having an Object ID of "14" which corresponds to the newly added File10.txt. Objects 7-9 identified by Map 260 (Start Number=7 and Count=3) correspond to Source Backup "1" and Source Index "10". Beginning with Index "10" in the first backup indicated by Table 250, the three objects with Object IDs of 10-12 are identified. Finally, the last entry of entries 266 in Map 260 identifies a tenth object which corresponds to Source Index "3" and Source Backup "2". By reference to Table 250, this identifies the object with Object ID "13". Accordingly, entries 266 of Extent Map 260 identify all objects present on the system at the time of the second backup.

Assume as before, additional changes are made to the system at a subsequent time, TIME 4, as follows:

| TIME 4 - Changes | |
|---|---|
| Delete | /test/DirA/File10.txt |
| Add | /test/DirD/ |
| Add | /test/DirD/File11.txt |
| Add | /test/DirD/File12.txt |
| Add | /test/DirD/File13.txt |
| Delete | /test/DirC/File9.txt |

Figure 5A:
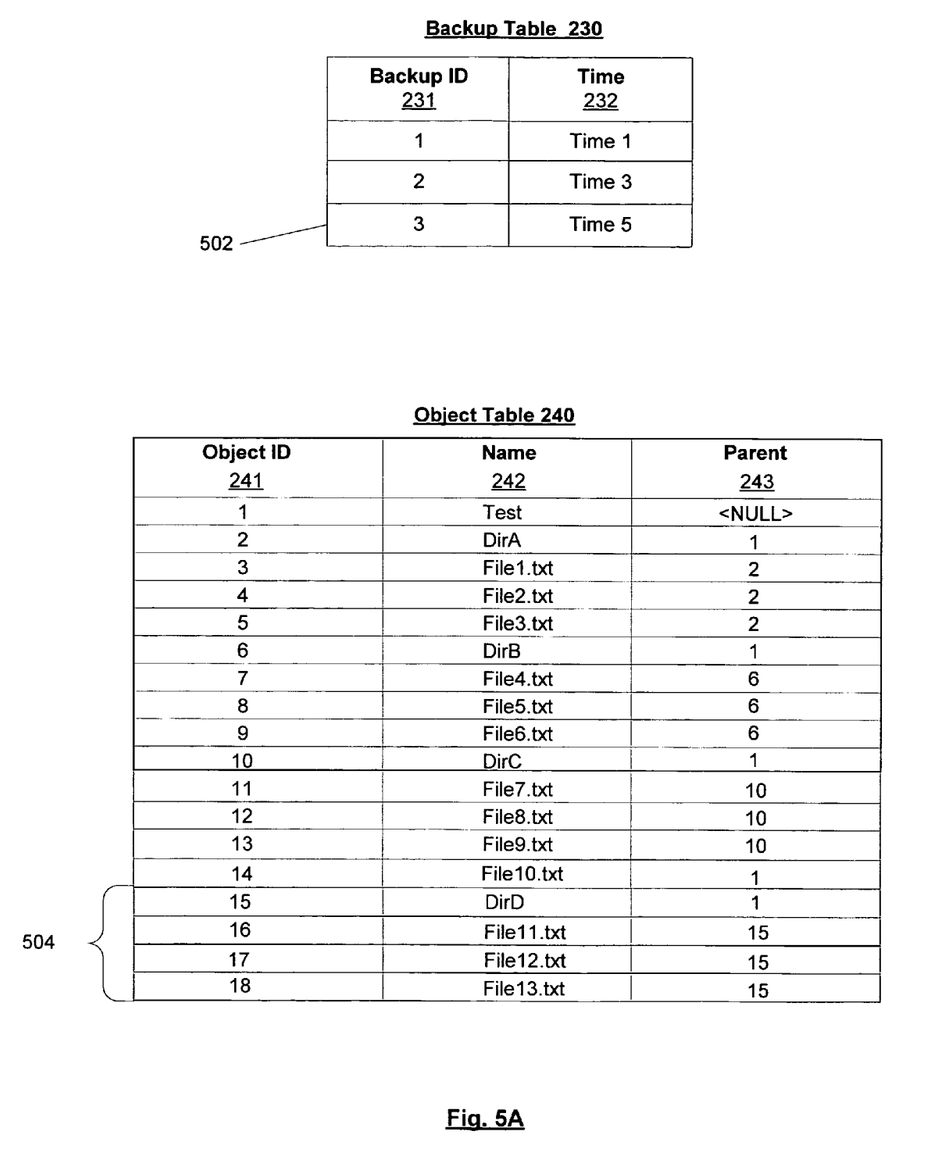
FIG. 5A depicts one embodiment of a backup table and object table.

Subsequent to the changes at TIME 4, the state of the system is as follows:
(Files on System)
/test
/test/DirA
/test/DirA/File1.txt
/test/DirA/File2.txt
/test/DirA/File3.txt
/test/DirC//test/DirC/File7.txt
/test/DirC/File8.txt
/test/DirD
/test/DirD/File11.txt
/test/DirD/File12.txt
/test/DirD/File13.txt Given the changes at TIME 4, an incremental backup is performed at TIME 5. FIG. 5A depicts the updated Backup Table 230 and Object Table 240 subsequent to the backup at TIME 5. Backup Table 230 now includes a new entry 502 which identifies a backup with ID "3" was taken at Time 5. Object Table 240 reflects the addition of four new objects in entries 504. These new objects, the new directory DirD and three new files—File11.txt, File 12.txt, and File13.txt, have Object IDs of 15-18, respectively. In addition, the parent of Object 15 (DirD) is identified as Object 1 (Test), and the parent of Objects 16-18 is identified as Object 15.

Figure 5B:
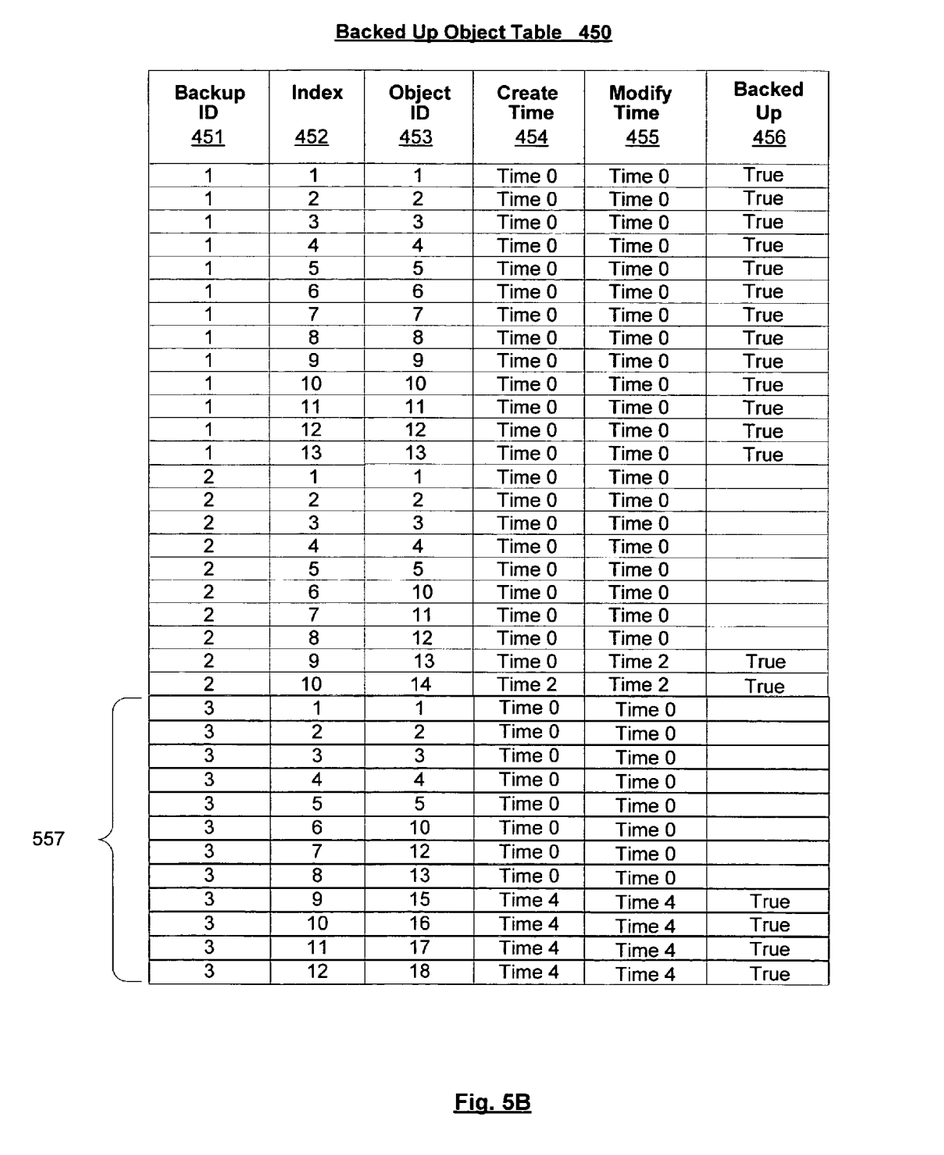
FIG. 5B depicts one embodiment of a table in a non-delta catalog approach.

Turning now to FIG. 5B, one example of a non-delta catalog approach subsequent to the backup at TIME 5 as we illustrated in FIG. 4B is shown. Backed Up Object Table 450 in FIG. 5B shows twelve new entries 557. As seen, each of the twelve entries correspond to one of twelve objects (Indexes 1-12) present on the system at the time of the backup at TIME 5. As before, an Object ID 453, Create Time 454, and Modify Time 455 are included. Also shown is an indication 456 as to whether a particular object was backed up during the backup procedure at TIME 5. In the example shown, the last four objects of entries 557 are shown to have been backed up during the third backup procedure.

Figure 5C:
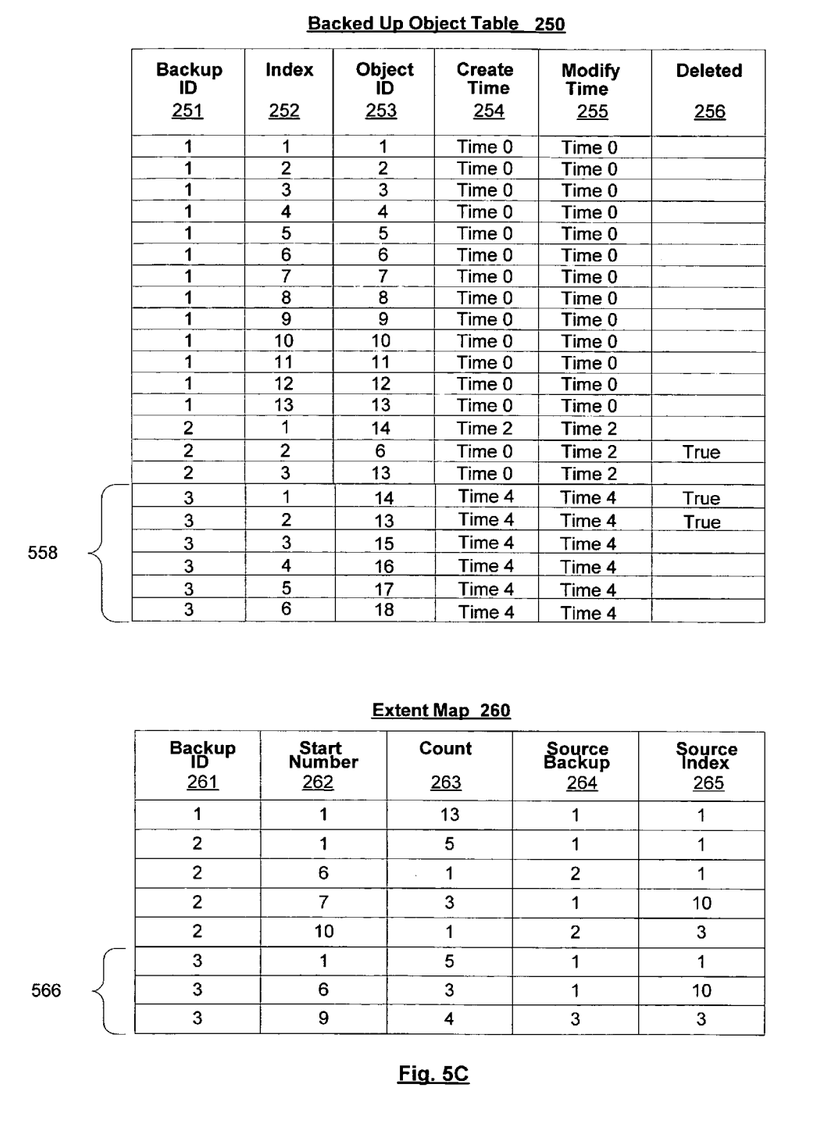
FIG. 5C depicts one embodiment of a backed up object table and extent map.

In contrast to FIG. 5B, FIG. 5C depicts a delta catalog approach subsequent to the third backup. Shown in FIG. 5C are the updated Backed Up Object Table 250 and Extent Map 260. Backed Up Object Table 250 in FIG. 5C includes six new entries 558. The first two of the new entries 558 depicted correspond to objects with IDs 13 and 14, which in turn correspond to File9.txt and File10.txt—both of which were deleted. Accordingly, the deleted column 256 for these two entries indicates they were deleted. Also included in entries 558 are entries for the newly added objects with Object IDs 15-18.

Extent Map 260 in FIG. 5C has been updated to include three new entries 566 corresponding to the third backup (Backup ID "3"). As previously noted, Extent Map 260 may be used to identify objects present in the system at the time of a particular backup procedure. In addition, as described above, each of the objects are enumerated in sequential fashion and assigned a particular ordinal. Therefore, by reference to Start Number 262 and Count 263, a count of the number of objects for a particular backup may be readily determined. In the example shown, the last entry of entries 566 has a start number of "9" and a count of "4". Therefore, the last entry describes objects 9-12 of the third backup. Consequently, a total of 12 objects were present at the time of backup three. It is noted that other embodiments may enumerate objects differently from that depicted.

Looking again at Map 260 of FIG. 5C, the particular objects present at the time of the third backup may be ascertained. The first five objects indicated (Start Number "1" with a Count of "5") correspond to a Source Backup of "1" and Source Index of "1". Therefore, backup "1" is identified in the Object Table 250 of FIG. 5C and the Index "1" is identified within that backup. In this case, index "1" of backup "1" in Table 250 corresponds to the very first entry of the table and the first five objects identified by first entry of the Extent Map entries 566 corresponds to Object IDs 1-5.

The second entry of entries 566 identifies objects enumerated 6-8 (i.e., Start Number "6" and Count equals "3"). These objects are identified as beginning with the Index "10" in the backup with ID "1". By reference to the Table 250 of FIG. 5C, these three objects are identified as corresponding to Object IDs 10-12. Finally, the last entry of entries 566 identifies objects enumerated 9-12. These final four objects are indicated as corresponding to Index "3" of the backup with ID "3". Referencing index "3" of backup "3" in Table 250 of FIG. 5C indicates these enumerated objects correspond to Object IDs 15-18.

As may be appreciated, for purposes of discussion the above examples make reference to a relatively small number of objects. However, generally speaking file systems and storage devices may have millions of such objects. In such systems, a delta catalog based approach may require significantly less storage for the catalog than a non-delta catalog approach. It is also noted that the delta catalog approach described provides an explicit indication in the Backed Up Object Table as to those objects which have been deleted. Consequently, identifying and restoring a system to a previous state may require less computation which may in turn result in a more rapid restore.

In view of the above, the delta catalog approach may reduce the amount of information stored for a true image restore (TIR) or synthetic restore (SYNTH) incremental backups. The delta catalog approach may also be applied to any catalog implementation whether the catalogs are using a proprietary format or whether they are using "generic" relational database technology. As described above, catalog embodiments may also save attributes such as modified time, or creation time for each object every time it is backed up. This information may help a user choose the appropriate version of an object to restore. In addition, any application that intends to create a synthetic full restore or to restore a system to it exact state at the time of the backup (true image restore—TIR) needs to "know" exactly which files were on the system when the backup was run. In the absence of the delta approach, saving a list of the files that were on the system at the time of the backup may require an entry for every object on the system. However, with a delta mechanism, only additions, changes, and deletions between the current backup and a previous backup are recorded along with the extent map. Therefore, instead of recording every object, which could be in the millions, a relatively small number of changes may be recorded.

Figure 6:
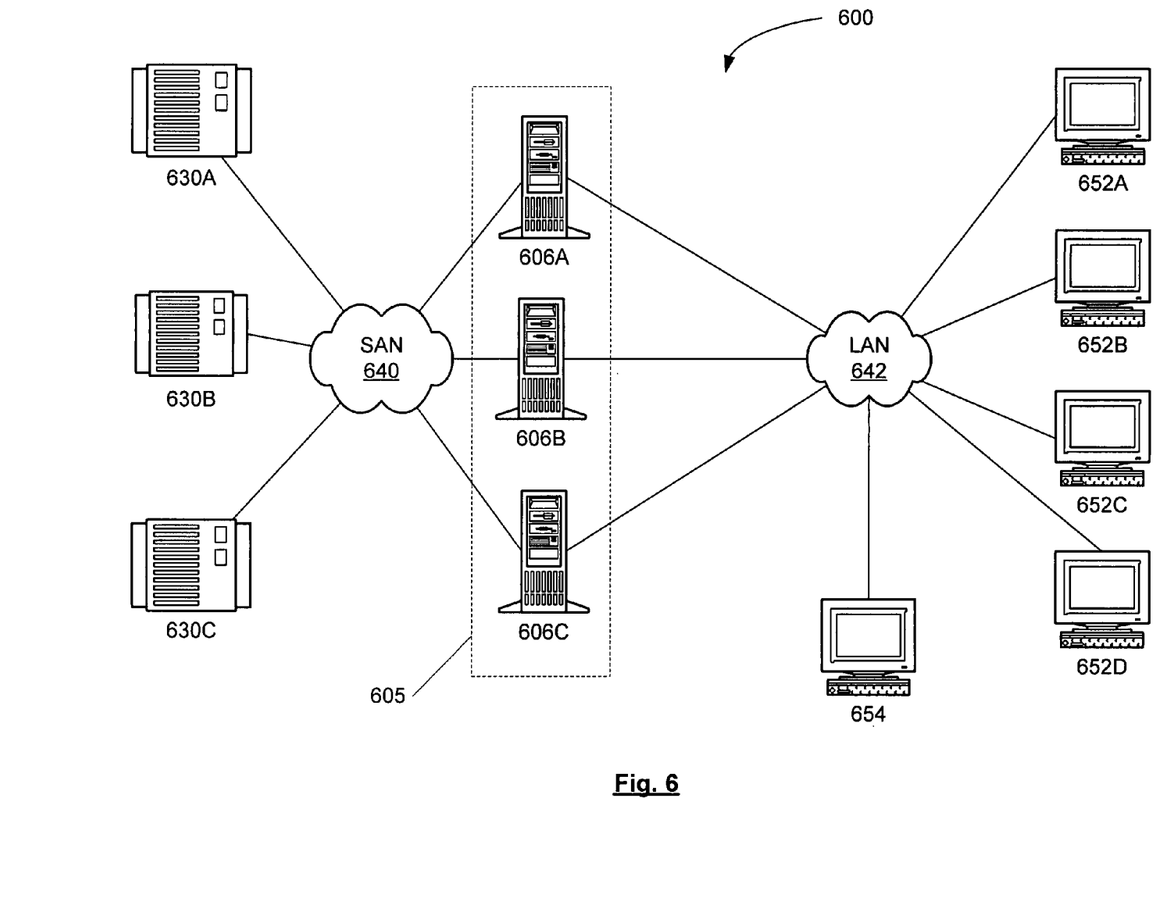
FIG. 6 depicts one embodiment of a computing system.

Turning now to FIG. 6, one embodiment of a computing system which incorporates the above described methods and mechanisms is illustrated. FIG. 6 shows one embodiment of a computing cluster, SAN, and LAN in a computer network 600. In the example shown, servers 606A-606C form a cluster 605. Together with data storage devices 630A-630C and SAN interconnect 640, servers 606 form a SAN. Servers 606 have direct access to any of the storage devices 630 which are connected to the SAN interconnect 640. SAN interconnect 640 is typically a high speed interconnect, such as Fibre Channel. As already noted, the servers and storage devices comprise a network in and of themselves. In the SAN, no server is dedicated to a particular storage device as in a LAN. Any server 606 may access any storage device 630 on the storage area network. Representative characteristics of a SAN may include a 200 MB/sec bandwidth, up to 526 nodes per loop, a connection distance of 50 kilometers, and a storage capacity of 9572 gigabytes. Consequently, the performance, flexibility, and scalability of a SAN may be significantly greater than that of a typical SCSI based system.

Also included in the network 600 of FIG. 6 are workstations 652A-652D and LAN interconnect 642. As shown in FIG. 6, LAN 642 is coupled to cluster 605. Because each storage device 630 may be independently and directly accessed by any server 606, overall data throughput between the LAN and SAN may be much greater than that of the traditional client-server LAN. For example, if workstations 652A and 652C both submit access requests to storage 630, two of servers 606 may service these requests concurrently. Alternatively, one of servers 606 may be configured as a failover server. In the event one of the servers 606 fails, another may become active in order to prevent service interruption or downtime.

In addition to workstations 652, FIG. 6 also depicts an administrator workstation 654 which may be used by a system administrator to configure and monitor operation of various hardware and software components in the network 600. In one embodiment, workstation 654 is configured to initiate backup and restore operations in accordance with the above described methods and mechanisms. As already noted, numerous such network configurations are possible and are contemplated.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A method for backing up objects in a computing system, the method comprising:
   initiating a first backup procedure corresponding to a plurality of objects in the computing system;
   updating a backed up object table in a catalog, wherein said updating comprises:
      generating and storing data which identifies only those objects backed up during the first backup procedure; and
      generating and storing data which identifies objects which were deleted prior to initiation of the first backup procedure and subsequent to a prior backup procedure, the prior backup procedure having occurred prior to the first backup procedure;
   updating an extent map in the catalog which identifies all of said plurality of objects, wherein said extent map identifies objects as one or more sequences of entries in the backed up object table.

2. The method as recited in claim 1, further comprising:
   updating a backup table in the catalog which identifies backups which have been performed in the system; and
   updating an object table in the catalog which identifies objects detected during said backups.

3. The method as recited in claim 2, wherein in addition to identifying objects detected during said backups, the object table further identifies relationships between objects identified in the object table.

4. The method as recited in claim 3, wherein the backed up object table includes for each entry:
   an identifier which identifies a particular backup procedure;
   a unique index for each entry corresponding to a particular backup procedure; and
   an object identifier which identifies a particular object.

5. The method as recited in claim 4, wherein the extent map includes for each entry:
   an identifier which identifies a particular backup procedure;
   a source backup identifier which identifies one or more entries of a particular back up procedure in the backed up object table; and
   a source index which identifies a particular entry of the one or more entries.

6. The method as recited in claim 5, wherein prior to generating and storing data which identifies said objects which were deleted subsequent to a prior backup procedure, the method further comprises accessing said catalog, determining a state of the computing system at the time of the prior backup procedure, and comparing said state to the plurality of objects to determine which objects have been deleted.

7. The method as recited in claim 6, wherein each entry of the backed up object table further includes both a time of creation for a corresponding object and a time of modification for a corresponding object.

8. A computing system comprising:
   a file system comprising a plurality of data objects;
   a storage device configured to store backed up data objects and a backup catalog; and
   a backup mechanism, wherein said backup mechanism is configured to:
      initiate a first backup procedure corresponding to a plurality of objects in the file system;
      update a backed up object table in the catalog, wherein updating the backed up object table comprises:
         generating and storing data which identifies only those objects backed up during the first backup procedure; and
         generating and storing data which identifies objects which were deleted prior to initiation of the first backup procedure and subsequent to a prior backup procedure, the prior backup procedure having occurred prior to the first backup procedure;
      update an extent map in the catalog which identifies all of said plurality of objects, wherein said extent map identifies objects as one or more sequences of entries in the backed up object table.

9. The computing system as recited in claim 8, wherein the backup mechanism is further configured to:
   update a backup table in the catalog which identifies backups which have been performed in the system; and
   update an object table in the catalog which identifies objects detected during said backups.

10. The computing system as recited in claim 9, wherein in addition to identifying objects detected during said backups, the object table further identifies relationships between objects identified in the object table.

11. The computing system as recited in claim 10, wherein the backed up object table includes for each entry:
   an identifier which identifies a particular backup procedure;
   a unique index for each entry corresponding to a particular backup procedure; and
   an object identifier which identifies a particular object.

12. The computing system as recited in claim 11, wherein the extent map includes for each entry:
   an identifier which identifies a particular backup procedure;
   a source backup identifier which identifies one or more entries of a particular back up procedure in the backed up object table; and
   a source index which identifies a particular entry of the one or more entries.

13. The computing system as recited in claim 12, wherein prior to generating and storing data which identifies said objects which were deleted subsequent to a prior backup procedure, the backup mechanism is configured to access said catalog, determine a state of the computing system at the time of the prior backup procedure, and compare said state to the plurality of objects to determine which objects have been deleted.

14. The computing system as recited in claim 13, wherein each entry of the backed up object table further includes both a time of creation for a corresponding object and a time of modification for a corresponding object.

15. A non-transitory computer readable storage medium comprising program instructions, wherein the program instructions are executable to:
- initiate a first backup procedure corresponding to a plurality of objects in the computing system;
- update a backed up object table in a catalog, wherein updating the backed up object table comprises:
  - generating and storing data which identifies only those objects backed up during the first backup procedure; and
  - generating and storing data which identifies objects which were deleted prior to initiation of the first backup procedure and subsequent to a prior backup procedure, the prior backup procedure having occurred prior to the first backup procedure;
- update an extent map in the catalog which identifies all of said plurality of objects, wherein said extent map identifies objects as one or more sequences of entries in the backed up object table.

16. The non-transitory computer readable storage medium as recited in claim 15, wherein the program instructions are further executable to:
- update a backup table in the catalog which identifies backups which have been performed in the system; and
- update an object table in the catalog which identifies objects detected during said backups.

17. The non-transitory computer readable storage medium as recited in claim 16, wherein in addition to identifying objects detected during said backups, the object table further identifies relationships between objects identified in the object table.

18. The non-transitory computer readable storage medium as recited in claim 17, wherein the backed up object table includes for each entry:
- an identifier which identifies a particular backup procedure;
- a unique index for each entry corresponding to a particular backup procedure; and
- an object identifier which identifies a particular object.

19. The non-transitory computer readable storage medium as recited in claim 18, wherein the extent map includes for each entry:
- an identifier which identifies a particular backup procedure;
- a source backup identifier which identifies one or more entries of a particular back up procedure in the backed up object table; and
- a source index which identifies a particular entry of the one or more entries.

20. The non-transitory computer readable storage medium as recited in claim 19, wherein prior to generating and storing data which identifies objects which were deleted subsequent to a prior backup procedure, the program instructions are executable to access said catalog, determine a state of the computing system at the time of the prior backup procedure, and compare said state to the plurality of objects to determine which objects have been deleted.

* * * * *